Oct. 27, 1964   J. R. JENSEN   3,154,270
AMPHIBIOUS LANDING GEAR FOR HELICOPTER
Filed Aug. 17, 1962   3 Sheets-Sheet 2

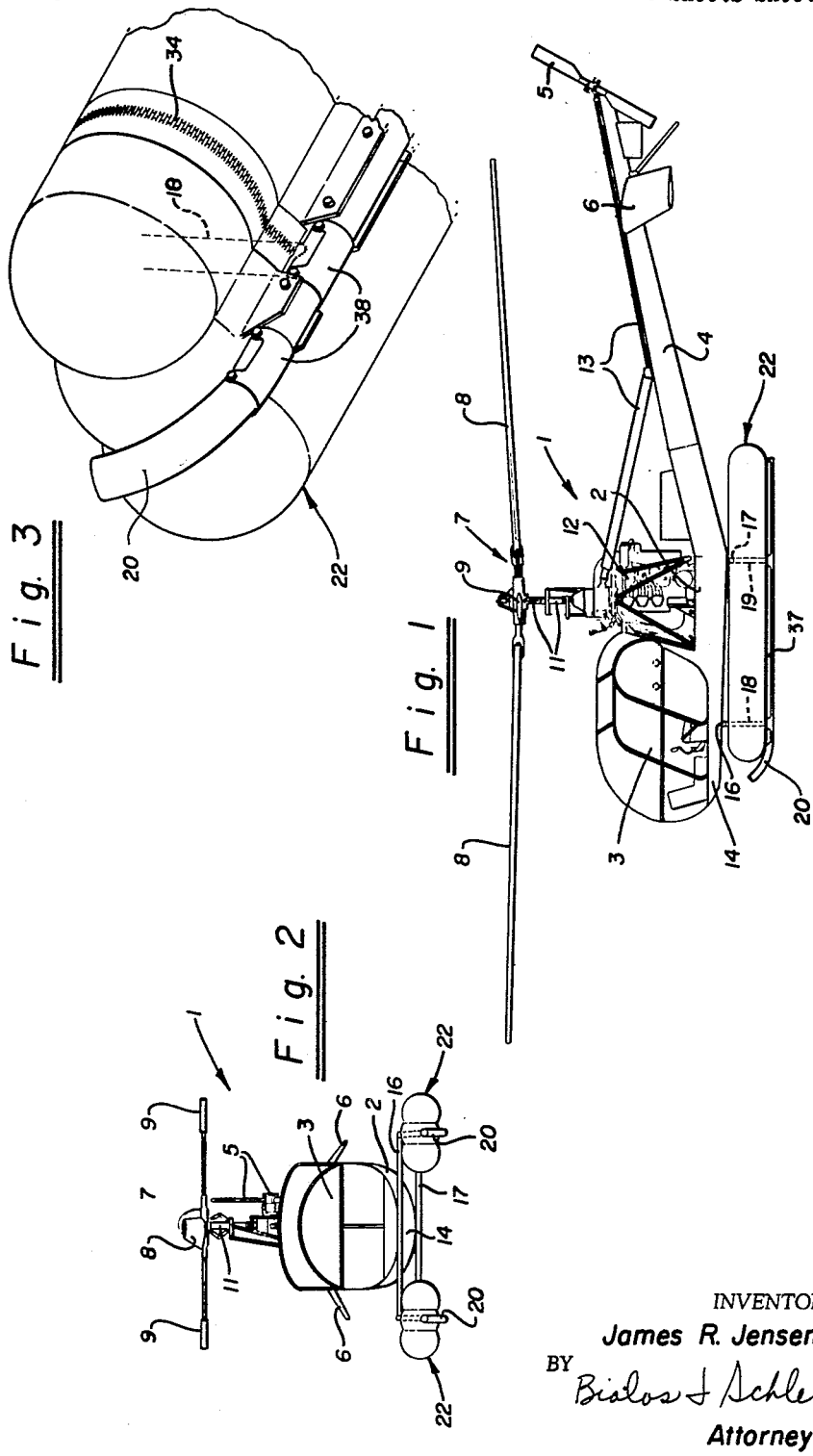

INVENTOR.
James R. Jensen
BY
*Bislost Schlemmer*
Attorneys

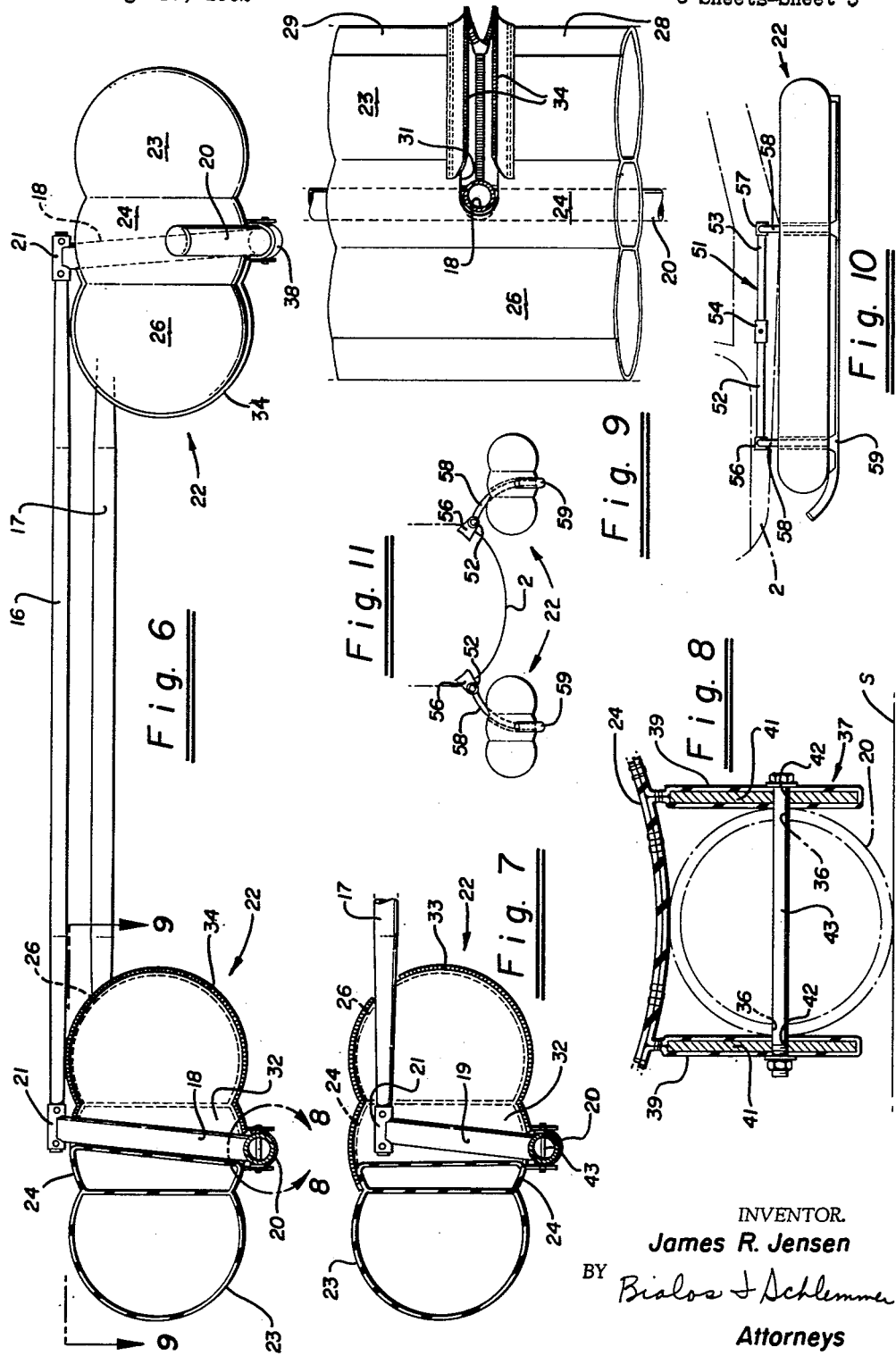

3,154,270
AMPHIBIOUS LANDING GEAR FOR
HELICOPTER
James R. Jensen, Los Altos, Calif., assignor, by mesne assignments, to Hiller Aircraft Company, Inc., Menlo Park, Calif., a corporation of Delaware
Filed Aug. 17, 1962, Ser. No. 217,669
13 Claims. (Cl. 244—101)

This invention relates generally to an aircraft and to landing gear construction therefor. More particularly, this invention relates to a helicopter type aircraft which is capable, with equal facility, of landing on and taking off from land or water.

Still more particularly, this invention relates to an amphibious helicopter having landing gear for supporting the helicopter on land or on water. In this regard, this invention is specifically directed to the landing gear of a helicopter type aircraft which includes buoyant structure for supporting the helicopter on a body of water in conjunction with means for supporting the helicopter on the ground.

This invention further relates to a helicopter having a chassis from which landing gear strut structure depends on opposite sides thereof, and in conjunction with each such structure buoyant means is removably secured for supporting the helicopter on water.

In this regard, the buoyant means thus employed is cooperable with strut structure of the helicopter landing gear so that the buoyant means in no way interferes with operation of the landing gear when the helicopter is to be operated from the ground. That is, the buoyant means of the subject landing gear is designed to be operatively positioned in conjunction with known helicopter landing gear structure so that minimum modification of the known landing gear is required to adapt the same to accommodate the buoyant means of this invention.

Accordingly, various landing gear constructions of the type heretofore employed for helicopters may be employed in the known manner for supporting the helicopter during landing and take-off from the ground with the subject buoyant means incorporated into such landing gear being an addition or complement to the known landing gear structure to adapt the helicopter for amphibious operation.

Hence, it is the principal purpose of this invention to impart amphibious characteristics to a helicopter without detracting from the capability of known landing gear structure to support the helicopter on the ground. By providing discrete low drag buoyant means in conjunction with the landing gear strut structure on each of opposite sides of the helicopter chassis, and by providing suitable means for detachably connecting the buoyant means to the opposed landing gear strut structures, a helicopter may be readily converted with a minimum of modification into an amphibious-type helicopter capable of landing with equal facility on ground or on water. As a result, a helicopter may be readily and easily adapted for amphibious operations by this invention with a minimum of expense and with minimum addition weight being imparted to the overall helicopter weight.

Heretofore, it has been broadly known to employ buoyant helicopter landing gear so that a helicopter could be landed on water. However, with prior known constructions, the buoyant means used was designed to serve the dual purpose of supporting the aircraft on water and also to support the aircraft on land. Generally, such heretofore known buoyant means are inflatable and, when the same are employed to support an aircraft on the ground, due to abrasion and friction encountered, puncture of the buoyant means frequently resulted and was always a possibility.

An important feature of the subject invention is that the buoyant means incorporated into the landing gear is provided as an adjunct to abrasion and friction proof means employed for supporting the aircraft on the ground so that the buoyant means is maintained out of contact with the ground when the helicopter is landed on the ground. In this way, the danger of damage to the buoyant means due to abrasion and friction when the helicopter is landed on the ground is precluded. That is, the subject landing gear includes means distinct from the buoyant means for engaging the ground when the helicopter is landed on the ground so that the buoyant means provided in conjunction with such ground engaging means is maintained out of engagement with the ground.

From the foregoing, it should be understood that objects of this invention include the provision of an aircraft having low drag amphibious landing gear in conjunction therewith; the provision of an amphibious helicopter having buoyant means in operative conjunction with ground engaging means thereof so as to be maintained out of contact with the ground when the helicopter is landed on the ground; the provision of preformed self-supporting buoyant means which may be operatively positioned in conjunction with the ground engaging means and strut structure of known landing gear constructions; the provision of means for connecting the subject buoyant means with the strut structure and ground engaging means of the landing gear; and the provision of inflatable pneumatic buoyant means for use in conjunction with known landing gear strut structure which is provided with passages for accommodating the struts and like portions of a landing gear construction when the buoyant means is operatively connected with the landing gear.

These and other objects of this invention will become apparent from a study of the following description, in which reference is directed to the accompanying drawings.

FIG. 1 is a side elevational view of a helicopter showing the landing gear of this invention in operative position thereon;

FIG. 2 is a front elevational view of the helicopter of FIG. 1;

FIG. 3 is an isometric view of a portion of the subject landing gear illustrating details of the operative interconnection of the buoyant means with the ground engaging means thereof;

FIG. 6 is a vertical sectional view through the subject landing gear taken in the plane of line 6—6 of FIG. 4;

FIG. 7 is a partial vertical sectional view through the landing gear taken in the plane of line 7—7 of FIG. 4;

FIG. 8 is a partial vertical section through the subject landing gear, on an enlarged scale, taken in the plane of line 8—8 of FIG. 6;

FIG. 9 is a partial plan view of the subject landing gear taken in the plane of line 9—9 of FIG. 6;

FIG. 10 is a side elevational view of a modified landing gear arrangement; and

FIG. 11 is a front elevational view of the modified arrangement of FIG. 10.

Figure 4:
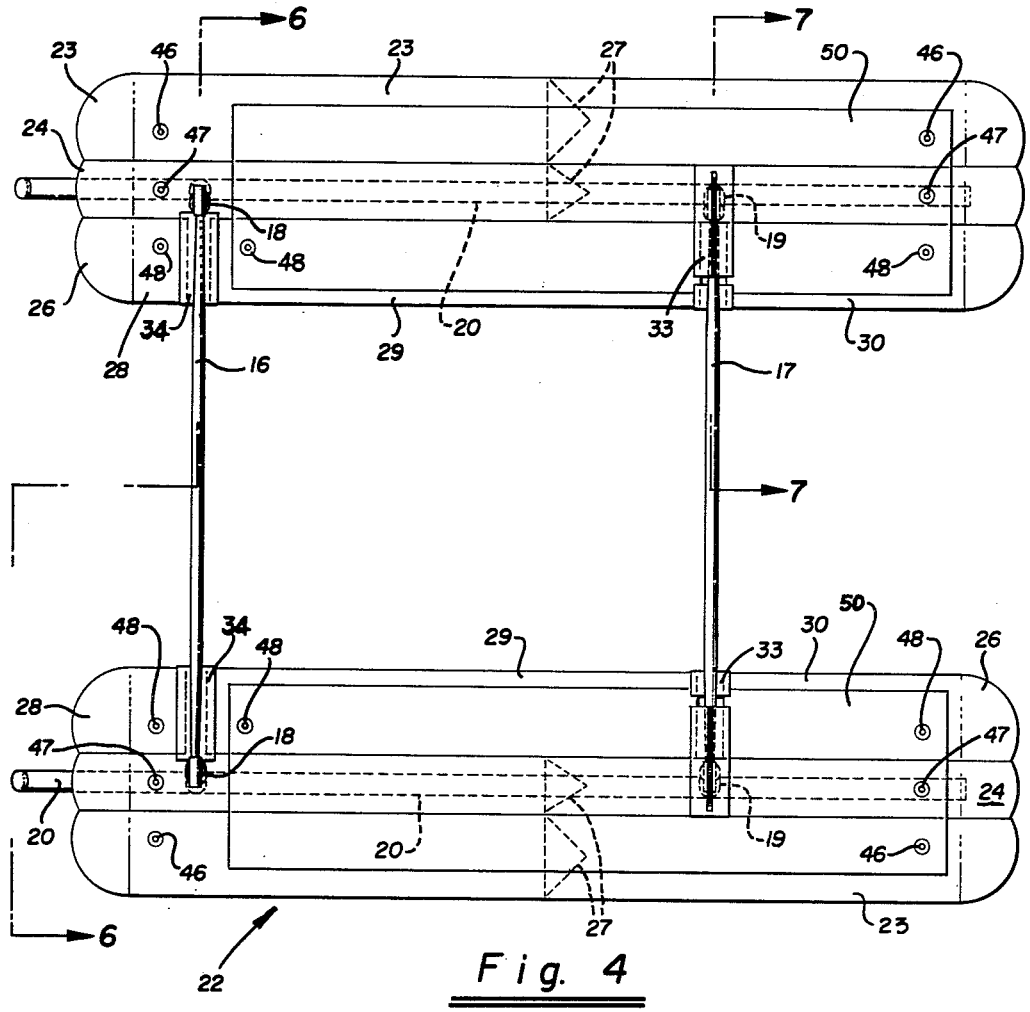
FIGS. 4 and 5 are top plan and side elevational views, respectively, of the subject landing gear.

As noted previously, a principal objective of this invention is to impart amphibious capability to a helicopter which heretofore was capable of landing only on the ground. To this end, buoyant means are provided for detachable connection with landing gear structure depending from opposite sides of a helicopter chassis, which buoyant means does not in any way interfere with the operation of known landing gear construction attached to and depending from the chassis.

The subject buoyant means is designed to be secured in operative position in generally straddling relationship relative to the depending landing gear strut structures which are employed to support the ground engaging means in known helicopters. Accordingly, minimum modification of known landing gear is required to adapt known helicopters for amphibious operation by employing this invention. To this end, it is contemplated that the subject buoyant means may be marketed in kit form ready for operative attachment to known aircraft.

In this regard, while non-inflatable buoyant means can be employed, the buoyant means chosen for this invention, as described in detail hereinafter, preferably is of the inflatable pneumatic type to minimize the weight added to the overall helicopter weight.

The type of landing gear of which the subjct buoyant means is to form a part is not restricted to any particular type. By way of example, as described in detail hereinafter, the buoyant means of this invention is equally well adapted for use with helicopters which employ so-called bendable type landing gear constructions, or which employ twistable torsion type landing gear constructions.

That is, the buoyant means may be employed equally well in conjunction with bendable landing gear in which rods deformable by bending extend laterally of and are secured to the helicopter chassis, and from outer ends of which suitable ground engaging means depend. Alternatively, the buoyant means of this invention may be employed in conjunction with twistable type landing gear in which rods deformable by torsional twisting extend generally longitudinally of the aircraft chassis, and from outer ends of which suitable ground engaging means depend.

Additionally, it should be understood that the buoyant means which impart amphibious characteristics to the subject helicopter landing gear may be designed, using the concepts taught herein, to accommodate other types of landing gear in addition to those mentioned above.

While one specific embodiment of buoyant means has been illustrated in the accompanying drawings, and while one simple arrangement for operatively and detachably yet positively securing the buoyant means to the opposite landing gear structures of the helicopter have been disclosed, it should be understood that other buoyant constructions and other attaching arrangements are contemplated as falling within the scope of this invention as may be devised by one skilled in the art after this disclosure has been studied.

It is an important feature of this invention, however, that the buoyant means employed and the particular means chosen for securing the buoyant means in operative position relative to the strut structures and the ground engaging means of the landing gear are readily adaptable for use with presently known helicopter constructions, so that modifications to such helicopter landing gear, other than of a relatively simple and minor nature, are unnecessary to adapt the helicopter for amphibious operation.

In this regard, it should be understood that, while the specific buoyant means disclosed and described herein comprises inflatable pneumatic bag structures, other arrangements which may be found suitable also may be employed without departing from the scope of this invention. For example, buoyant self-supporting constructions which are filled with light-weight buoyant material could be employed, although the illustrated inflatable bag structure is preferred due to its light-weight and ease of handling.

With the foregoing in mind, reference is directed first to FIGS. 1 and 2, which illustrate generally an amphibious helicopter employing a landing gear installation embodying this invention. A helicopter 1 of generally known construction is illustrated, which comprises a chassis 2 which includes a pilot's station 3 at the forward end thereof. Extending rearwardly of the chassis from the pilot's station is a tail boom 4, on which is rotatably mounted a tail rotor 5 and a pair of flight stabilizing tail planes 6.

A lift rotor structure, generally designated 7, which includes a series of rotor blades 8 and control paddles 9, is positioned over the chassis of the helicopter for rotation thereabove about the upright axis of a rotor shaft 11 to propel the helicopter in flight. Means is provided for positively rotating the rotor above the chassis which, in the illustrated embodiment, comprises an engine 12 mounted on the chassis behind the pilot's station. The rotor 7 is operatively connected with the engine 12 through the rotor shaft 11 in the well known manner. The tail rotor 5 also is operatively connected with and driven by the engine 12 through a tail rotor drive shaft structure 13 in the well known manner.

Other details of the subject helicopter, such as the manner of regulating the pitch of the lift rotor blades and the pitch of the tail rotor blades, have not been illustrated in detail as these features are well known in the helicopter art and form no part of the present invention.

Secured to the underside 14 of the helicopter chassis 2, in a well known manner, is a landing gear construction which is the subject of this invention. Such landing gear, in the embodiment illustrated in FIGS. 1, 2, and 4, through 6, is of the type generally referred to as a bendable type landing gear, which comprises a pair of deformable generally parallel fore and aft laterally extending rods 16 and 17 which project transversely of the chassis. Details of the manner in which such rods are operatively connected with the helicopter have not been illustrated in detail, as the same is well known in the art. In this regard, as shown in FIGS. 1, 2 and 6, the aft rod 17 is on a lower horizontal level than is the fore rod 16 due, in part, to the sloping contour of the underside of the chassis of the illustrated aircraft.

Opposite ends of each of the rods 16 and 17 are located outboard of the chassis a substantial distance to impart stability to the helicoper when the same is landed on a supporting surface. A depending strut 18 is secured to each outboard end of the fore rod 16 and a depending strut 19 is secured to each outboard end of the aft rod 17. As will be described hereinafter, the strut structure at each side of the helicopter chassis defined by the outboard ends of the transverse rods 16 and 17 and the struts depending from such outboard ends is employed for operatively securing the buoyant means of this invention in place. And, as noted previously, such buoyant means may be secured in position relative to such strut structure with only minimum modification thereof.

To the lower ends of the pair of struts 18 and 19 at opposite sides of the aircraft, suitable ground engaging means is operatively connected. In the embodiment illustrated, such ground-engaging means comprises an elongated runner member 20 of the so-called skid type. While one particular type of ground engaging means has been illustrated, it should be understood that other types of ground engaging means could equally well be employed with this invention without departing from the spirit hereof. For example, wheels could be secured to the bottom of each strut 18, 19.

In the embodiment illustrated, the skid runners 20 are shown welded to the lower ends of the respective landing gear struts, and the upper end of each strut is shown bolted in a fixture 21 (FIGS. 6 and 7) secured to the outboard ends of the respective fore and aft rods 16 ands 17. However, other methods for connecting these components of the landing gear operatively together may be employed if preferred.

The embodiment of the buoyant means illustrated for use with the invention disclosed preferably is of inflatable pneumatic flotation bag construction, which is preferred because of its light weight. In this regard, the particular inflatable bag construction 22 employed preferably is compartmented as will be described so that should one compartment of the bag become accidentally punctured for any reason, the bag structure remaining intact will be sufficiently effective to buoyantly support the aircraft on a body of water.

In the embodiment illustrated, each bag structure 22 employed is longitudinally compartmented and is defined by a series of discrete tubular inflatable sections operatively secured together to define a single operative buoyant bag construction. In this regard, the bag structure chosen may be formed from any suitable material, such as a tough yet light-weight rubber or rubber compound of the type well known for use in manufacturing inflatable life rafts and like pneumatic articles. The exact material chosen, however, must have rugged characteristics, including abrasion and puncture resistance, to resist the forces applied to the bag structure when the aircraft is landed on a body of water, and to resist puncture from rocks or other hard objects if the aircraft is landed on irregular terrain so that the weight of the aircraft cannot be supported fully be the skids 20.

The inflatable sections employed with the subject bag structure comprise elongated cylindrical tubes which are bonded together over substantial portions of their contacting surfaces, as best shown in FIGS. 6 and 7, so that a secure and sturdy joint results. While three side-by-side tube sections 23, 24 and 26 are employed in the embodiment illustrated, the exact number chosen may vary, depending upon various factors, such as the type of aircraft with which the buoyant means is to be employed.

Because the tube sections are bonded with each other along substantial side surface portions thereof, the intermediate tube section 24 assumes a generally rectangular configuration when the sections are inflated, while the outer tube sections 23 and 26 retain a generally circular configuration for the majority of their peripheries. Viewed from an end thereof, the connected tube sections in unison define a generally oblong or oval configuration, as seen in FIGS. 2, 6 and 7. Such a configuration minimizes drag when the aircraft is in forward flight.

The respective tubular sections which together define the inflatable bag structure are bonded together by any suitable rubber or rubber-base cement, or other suitable adhesive, which is compatible with the material from which the respective sections are manufactured. The adhesive means chosen must be capable of withstanding adverse effects of fresh and salt water, as well as the varying degrees of temperature and other conditions which would be encountered during normal helicopter flight.

If desired, each bag structure 22 may be provided with internal reinforcement to rigidify the bag structure when the same is inflated. To this end, at least some of the compartmented tubular sections of the bag structure are provided with internal imperforate reinforcing members 27. In the illustrated embodiment, such members are positioned in the respective outboard and intermediate tubular sections 23 and 24 respectively. See FIGS. 4 and 5. Such a reinforcing member which, in the embodiment illustrated, is of somewhat conical configuration conforming to the internal configuration of the respective tubular sections, is not employed in the inboard tubular section 26. However, if such reinforcement is desired in the inboard section also, a modified valve arrangement somewhat different from that illustrated and hereinafter described will be required.

Each bag structure is designed so that the same may readily be positioned operatively in conjunction with the strut structure at opposite sides of the helicopter. That is, each bag structure is provided with means to permit the bag structure to straddle or fit around the strut structure. To this end, in the illustrated embodiment, each inboard tubular section 26 is longitudinally divided into three separate inflatable portions 28, 29 and 30 (FIG. 4), which are separated by fore and aft lateral passages 31 and 32 extending transversely therethrough. Such passages adapt the bag structure to receive slidably the respective fore and aft struts 18 and 19 of the landing gear. That is, each bag structure is provided with a pair of lateral passages 31 and 32 which extend vertically for the full height of the bag structure laterally through the inboard tubular section 26 and at least partially laterally through the intermediate tubular section 24 so that the bag structure may be positioned around the depending struts 18 and 19 of the landing gear. Obviously, the longitudinal spacing between the passages 31 and 32 corresponds to the longitudinal spacing between the respective struts 18 and 19 of the particular aircraft to which the bag structure is to be attached.

Preferably, as seen in FIGS. 6, 7 and 9, each lateral passage terminates substantially midway of the intermediate tubular section 24, so that an equal amount of the bag structure lies both inboard and outboard of the respective depending struts 18 and 19 to insure desirable buoyant balance for supporting the helicopter on a body of water.

After the respective bag structures have been positioned in operative straddling location with respect to the depending strut structures, they are secured firmly in place to produce their intended function. To this end, means are provided for securing the bag structures to the runner skid members 20 in surrounding relationship with respect to the opposed strut structures of the landing gear as will be described.

Means are provided along opposed marginal portions of the lateral passages 31 and 32 for closing the passages around the struts, and around the ends of the transverse rod members 16 and 17 when required, after the bag structures have been operatively positioned. Such closure means may take various forms, such as ties or laces. However, more efficient and easier to use means, such as rapid slide fasteners, preferably of the zipper type which have interengaged links, are preferred. To resist corrosion, slide fasteners having plastic links are preferred, such as links made from nylon.

The fastening means for closing off the respective passages preferably follow the outer contour of the tubular sections 26 and 24 which define the lateral passages, as shown in FIGS. 6 and 7. In this connection, the slide fastener 33 employed with the aft strut structure is formed in two parts (see FIGS. 4 and 7) so that the outboard ends of the bendable transverse rods 17 may be received within the lateral passages 32 and the slide fasteners closed thereover, both above and below such rod outboard ends. Because the aft transverse rod is on a lower level than the fore rod 16, it is necessary to design the bag structure to accommodate the outboard ends of such rod as shown in FIG. 7.

However, if the fore and aft rods are on the same horizontal level, the particular arrangement shown in FIG. 7 would be modified to correspond to the arrangement shown in FIG. 6 with respect to the fore rod 16. The fore struts 18 are of sufficient length so that the outboard ends of fore rod 16 overlie the bag structure. This permits use of a continuous slide fastener 34 to close off the front passage 31 after the bag structure is properly positioned.

As mentioned previously, the important objective of this invention is to design the subject landing gear so that the same may be incorporated generally into known landing gear with a minimum of modification. In the embodiment shown, the only modification required is the provision in the skid runner members 20 of a series of lateral apertures 36 through which fasteners may be extended for securely connecting the bag structure in place around the strut structure of the landing gear.

Figure 5:
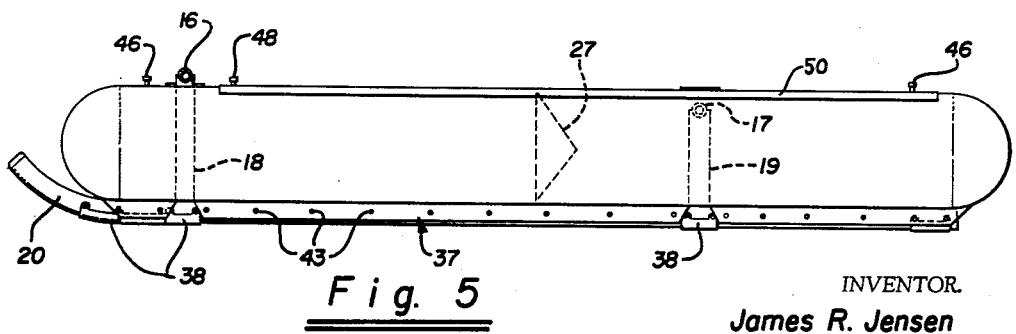

With the embodiment illustrated, to effect positive securing of each bag structure to its associated skid runner, girt or flange means, generally designated 37 in FIGS. 5 and 8, is provided in depending arrangement from the bottom of each bag structure. Such girt is of discontinuous construction so that the same may be positioned to straddle scuff plates 38 positioned on the underside of each skid runner in line with the respective struts 18 and 19, and so that the depending struts may be properly located in the lateral passages 31 and 32.

Details of the girt structure are shown best in FIG. 8 and each girt comprises spaced depending flange members 39 formed from a reversely folded piece of material bonded or adhesively joined with the underside of the intermediate tube section 24 of each bag structure. For purposes of reinforcement, each flange member 39 has provided therein a series of reinforcing washers or plates 41. Each reinforcing plate is aligned with one of a series of spaced lateral apertures 42 formed along the length of each flange of the girt to accommodate the respective fasteners employed.

Each flange 39 is spaced from the other along the length of the girt a distance determined by the diameter of skid 20 to securely engage opposite side portions of its associated skid. Suitable fasteners, such as conventional bolts 43 or other means, are extended through the aligned holes provided in the skid and in the opposite flanges of the girt for securing positively the bag structure to the skid runner.

The respective bag structures may be secured in position after the bag structures have been inflated. However, so that the bags may be attached in position without requiring elevation of the helicopter by employing hoists, jacks or the like, it is preferred that the bag structures be positioned around the struts prior to inflation so that access may be had to the girt on the underside of the bag structures to permit insertion and tightening of the fasteners employed. Thereafter, the respective tubular sections of the bag structures may be inflated and the lateral passages closed by the zippers or other suitable closure means employed.

As seen in FIG. 8, the bag structure is maintained by its associated skid 20 a substantial distance above a supporting ground surface S so that the bag structure will be free of contact with such surface when the helicopter is landed on the surface to preclude bag damage.

To permit selective inflation and deflation of each bag structure, a series of valves, which may be of any well known type, are employed with the separate compartments of the bag structure. In this regard, details of the particular valve structure employed have not been shown, as conventional valves, such as the type commonly used with air mattresses or inflatable life rafts, may be employed. It should be understood that choice of the valves employed may be made to meet a particular need.

In the embodiment illustrated, in which the outboard tubular section 23 is divided into two compartments by a reinforcing member 27, a valve 46 is provided adjacent each end of the section. Similarly, a valve 47 is positioned adjacent the opposite ends of each intermediate tubular section 24. In this regard, air is introduceable directly into the center portions of each intermediate section because the lateral passages 31 and 32 extend only part way through the intermediate tube section 24 as shown in FIGS. 7 and 9.

However, with respect to each inboard tubular section 26, three valves 48 are required because the section is divided into three discrete inflatable sections by the lateral passages 31 and 32. An additional valve would be required in the center portion 29 of tubular section 26 if an imperforate reinforcing member 27 is employed therein.

Preferably a sheet of reinforcing material 50 may be positioned over the top of the respective tubular sections of each bag structure as shown in FIG. 4 to provide a wear resistant surface along the top of each bag structure so that persons may stand on or walk along a bag structure without damaging the same. Such reinforcing sheet preferably is bonded adhesively and securely to the respective tubular sections of the bag structure.

FIGS. 10 and 11 illustrate the subject invention employed with a modified type landing gear employed with helicopters which is of the so-called twistable or torsion type. The torsion type landing gear differs from the bendable type described previously in that the rod structures employed with the torsion type extend longitudinally of the aircraft chassis 2 rather than transversely thereof.

As seen in FIG. 10, one torsion type landing gear construction has been illustrated which comprises, at each side of the chassis, an elongated rod structure 51 which is divided into two operatively distinct longitudinal sections 52 and 53. These rod sections are secured at their adjacent ends to the chassis by a mounting bracket 54 secured in any suitable manner to the chassis. Thus bracket 54 precludes free rotation of the rod sections. Each of the longitudinal rod sections 52 and 53 at its free or outer end is pivotally mounted in a bearing bracket designated 56 and 57.

It should be understood that the rod sections are secured against free rotation by the intermediate bracket 54 but are free to twist torsionally relative to the chassis due to their pivotal mounting in brackets 56 and 57.

Depending from the opposite outer ends of the rod sections 52 and 53 and secured thereto in any suitable manner are curved struts 58 which have ground engaging runner skids 59 or other suitable means secured to the lower end thereof in any well known manner.

With such a torsion rod landing gear arrangement, suitable bag structures of the type described previously may be secured in position for imparting amphibious characteristics to the helicopter.

For purposes of illustration, one specific embodiment of the subject invention will be described in detail, but it should be understood that such description is not intended to be in any way limiting. A four place helicopter of the type produced by applicant's assignee, Hiller Aircraft Corp., and designated as its UH–12–E4 helicopter may be provided effectively with the subject amphibious landing gear. Such an aircraft, depending upon the particular equipment installed therein, has a gross weight of approximately 2500–3000 pounds.

The bag structures disclosed herein are designed to accommodate such weight with a suitable factor of safety. To this end, each bag structure for such aircraft is manufactured with an overall length of approximately 150 inches with a spacing of approximately 80½ inches between centers of the passages to accommodate the depending struts of the landing gear. The fore passage is located approximately 19½ inches from the fore end of the bag structure. The combined width of the tubular sections of each bag structure is approximately 35 inches and the structure's height is 17½ inches.

It has been found that a relatively low pressure in the range of 1.5 to 6.0 pounds per square inch gauge is suitable for providing the desired buoyancy, with a pressure of 1.5 to 2.0 p.s.i.g. normally being adequate. Such a bag construction at the indicated pressure is free of detrimental pressure effects at altitudes up to 12,000 feet. The volume of each bag structure is approximately 46 cubic feet of air which gives a buoyancy factor in fresh water for each structure of approximately 2900 pounds.

With the described bag structure, a minimum amount of weight is added to the overall weight of the aircraft in that each bag structure adds only 35 to 40 pounds additional weight to the aircraft. In a preferred embodiment, the weight of each bag structure is approximately 38 pounds.

Having thus made a full disclosure of this invention, and one particular embodiment thereof in detail, attention is directed to the appended claims for the scope to be afforded thereto. Modifications of this invention which may become evident to one skilled in the art after reference has been taken to this disclosure are contemplated as falling within the spirit and scope of this invention.

What is claimed is:

1. Amphibious landing gear for a helicopter comprising opposing strut structures to be located on each side of the chassis of said helicopter in depending relationship, ground engaging means secured to the lower end of each of said strut structures, and buoyant means in conjunction with each of said strut structures and detachably connected therewith, each said buoyant means having lateral passages therein for accommodating its associated strut structure so that such buoyant means may be moved in a lateral direction relative to its associated strut structure so that such buoyant means may be positioned around or removed from such strut structure without requiring separation of said ground engaging means from such strut structure, each said buoyant means being operatively secured to its associated strut structure and ground engaging means above such ground engaging means so that said helicopter may be landed on the ground and supported thereon by said ground engaging means or on a body of water and supported thereon by said buoyant means.

2. The helicopter of claim 1 in which each said buoyant means comprises an inflatable compartmented flotation bag structure.

3. An amphibious helicopter comprising a chassis, rotor structure projecting above said chassis, means for rotating said rotor structure above said chassis to propel said helicopter in flight, and amphibious landing gear secured to said chassis and depending therefrom; said landing gear comprising opposing strut structures operatively connected with said chassis of said helicopter, means secured to each of said strut structures for supporting said helicopter on the ground, and buoyant means in addition to and in conjunction with said ground supporting means for buoyantly supporting said helicopter on a body of water, each said buoyant means including passage structure permitting such buoyant means to be detachably secured to its associated strut structure and ground supporting means so as to be separable therefrom without requiring disassembly of such strut structure or separation of said ground supporting means from such strut structure.

4. The landing gear of claim 3 in which each said buoyant means comprises an elongated inflatable bag structure which includes means for positively securing the same to its associated ground supporting means, each said bag structure comprising a series of separately inflatable compartments.

5. Buoyant means to be employed with and operatively secured to the landing gear of a helicopter to adapt said helicopter for amphibious operations, such landing gear including depending strut structure and ground engaging means secured to said strut structure; said buoyant means comprising an elongated buoyant structure having spaced laterally extending passages projecting thereinto from a side thereof to accommodate said depending strut structure of said landing gear, said passages permitting said buoyant structure to be moved laterally relative to said strut structure so that said buoyant structure may be attached to or removed from such strut structure without disassembling said strut structure or separating said ground engaging means therefrom, means for closing off said passages when said strut structure is accommodated therein, and means on the underside of said buoyant structure for securing said buoyant structure to said ground engaging means of said landing gear.

6. The buoyant means of claim 5 in which said buoyant structure comprises an inflatable bag defined by a series of separate inflatable compartments, and which includes internal reinforcing members in at least some of said compartments for rigidifying said bag.

7. A helicopter construction including amphibious landing gear depending from the chassis of said helicopter, said landing gear comprising a pair of struts on each side of said chassis, an elongated ground engaging runner member secured to and extending between the struts of each said pair of struts for supporting said helicopter on the ground, and a buoyant inflatable bag structure in conjunction with and overlying each said runner member; each said bag structure including a pair of lateral passages extending partially therethrough from a side thereof for receiving an associated pair of struts therein whereby such bag structure may be positioned to straddle such struts without requiring disassembly of such struts or separation of said runner member from such struts, and means detachably securing each said bag structure to its associated runner member.

8. A helicopter construction including amphibious landing gear depending from the chassis of said helicopter, said landing gear comprising a pair of struts on each side of said chassis, an elongated ground engaging runner member secured to and extending between the struts of each said pair of struts for supporting said helicopter on the ground, said runner members having a series of spaced apertures extending transversely therethrough, and an elongated buoyant inflatable bag structure in conjunction with and overlying each of said runner members; each said bag structure being longitudinally divided into a series of separately inflatable compartments and including a pair of lateral passages extending into at least one of said compartments from a side of such bag structure for receiving an associated pair of struts therein whereby such bag structure may be positioned to straddle such struts without requiring disassembly of such struts or separation of said runner member from such struts, and means securing said bag structure to its associated runner member; said means comprising a flange structure which extends along the underside of said bag structure, said flange structure having apertures therethrough in alignment with the apertures in its associated runner member, and fasteners extending through such aligned apertures securely retaining said bag structure to its associated runner member.

9. The helicopter construction of claim 8 in which each said bag structure includes internal reinforcing members in at least some of said compartments for rigidifying such bag structure.

10. A helicopter construction including amphibious landing gear depending from the chassis of said helicopter, said landing gear comprising a pair of struts on each side of said chassis, an elongated ground engaging runner member secured to and extending between the struts of each said pair of struts for supporting said helicopter on the ground, and buoyant inflatable bag structure in conjunction with and overlying each of said runner members; each said bag structure including a pair of lateral passages extending partially laterally therethrough for receiving an associated pair of struts therein whereby such bag structure may be positioned to straddle such struts without requiring disassembly of such struts or separation of said runner member from such struts, closure means for restricting said passages when said struts are received therein, and means securing said bag structure to its associated runner member.

11. The helicopter construction of claim 10 in which said closure means of each said bag structure comprises a slide fastener which generally follows the outer contour of said bag structure bordering each of said passages.

12. An amphibious helicopter capable of landing upon and taking off from both water and land, comprising a chassis, opposing strut structures operatively secured to and depending from said chassis on opposite sides thereof, means secured to the bottom ends of said depending strut structures for supporting said helicopter on the ground, inflated flotation bag structures on opposite sides of said chassis positioned to straddle each of said strut structures above the associated ground supporting means secured thereto, each said bag structure having passage means therein permitting attachment and removal of such bag structure relative to its associated strut structure without requiring disassembly of such strut structure or separation of its associated ground supporting means therefrom, and means detachably securing each said bag structure to its associated strut structure and ground supporting means so that such bag structure may be selectively removed therefrom when amphibious capability of said helicopter is not required and reattached thereto when amphibious capability is desired.

13. The amphibious helicopter of claim 12 in which each of said bag structures includes slide fasteners for restricting said passage means when such bag structures are operatively positioned relative to said strut structures.

References Cited in the file of this patent
UNITED STATES PATENTS

| | | |
|---|---|---|
| 2,391,326 | McKinley | Dec. 18, 1945 |
| 2,544,794 | Kelley | Mar. 13, 1951 |
| 2,955,785 | Smith | Oct. 11, 1960 |
| 3,049,731 | Ertl et al. | Aug. 21, 1962 |